US006675170B1

(12) United States Patent
Flake (10) Patent No.: US 6,675,170 B1
(45) Date of Patent: Jan. 6, 2004

(54) METHOD TO EFFICIENTLY PARTITION LARGE HYPERLINKED DATABASES BY HYPERLINK STRUCTURE

(75) Inventor: Gary William Flake, Lawrenceville, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 318 days.

(21) Appl. No.: 09/606,144

(22) Filed: Jun. 29, 2000

Related U.S. Application Data (60) Provisional application No. 60/148,253, filed on Aug. 11, 1999, and provisional application No. 60/199,764, filed on Apr. 26, 2000.

(51) Int. Cl.$^7$ .............................................. G06F 17/30
(52) U.S. Cl. .......................................... 707/101; 707/2
(58) Field of Search ............................. 707/1–10, 100, 707/101–104.1; 715/513

(56) References Cited

U.S. PATENT DOCUMENTS

| | | | |
|---|---|---|---|
| 5,999,929 A | 12/1999 | Goodman | |
| 6,038,574 A | 3/2000 | Pitkow et al. | |
| 6,112,202 A | * 8/2000 | Kleinberg | ....................... 707/5 |
| 6,182,091 B1 | 1/2001 | Pitkow et al. | |
| 6,256,648 B1 | * 7/2001 | Hill et al. | .................... 707/501 |
| 6,285,999 B1 | 9/2001 | Page | |

OTHER PUBLICATIONS

J.M. Kleinberg, "Authoritative Sources in a Hyperlinked Environment", In Proceedings of the Ninth Annual ACM/SIAM Symposium on Discrete Algorithms, pp. 668–677, San Francisco, CA, Jan. 25–27, 1998.

M.R. Garey, et al., "Computers and Intractability: A Guide to the Theory of NP–Completeness", pp. 209–210, W.H. Freeman, New York, 1979.

S. Deerwester, et al., "Indexing by Latent Semantic Analysis", Journal of the American Society for Information Science, 41(6): 391–407, 1990.

S.Z. Selim, et al., "K–Means–Type Algorithms: A Generalized Covergence Theorem and Characterization of Local Optimality", IEEE Transactions on Pattern Analysis and Machine Intelligence, 61(1): 81–87, 1984.

E. Garfield, Citation Indexing: Its Theory And Application In Science, Technology, and Humanities, pp. 98–147, Wiley, New York, 1979.

R.R. Larson, Bibliometrics Of The World Wide Web: An Exploratory Analysis Of The Intellectual Structure Of Cyberspace, In Ann. Meeting of the American Soc. Info. Sci., pp. 71–78, 1996.

(List continued on next page.)

*Primary Examiner*—Safet Metjahic
*Assistant Examiner*—Marc Filipczyk
(74) *Attorney, Agent, or Firm*—Scully, Scott, Murphy & Presser (57) ABSTRACT

Method for partitioning a database containing a plurality of documents into desired and undesired type documents, the plurality of documents containing text and/or links to and from other documents in the database, including: providing a source document of the desired type, the source document including a collection of seed documents linked to more similar documents of the desired type than to dissimilar documents of the undesired type; providing a sink document for providing access to the database, the sink document being generic and representative of the database; identifying a cut-set of links which is the smallest set of links such that removing them from the database completely disconnects the source document and its linked documents from the sink document and its linked documents into first and second subsets of documents, respectively; and defining the first subset of documents as desired type documents and the remaining documents as undesired type documents.

27 Claims, 3 Drawing Sheets

OTHER PUBLICATIONS

J. Edmonds, et al., "Theoretical Improvements in Algorithmic Efficiency for Network Flow Problems", Journal of the Association for Computing Machinery, 19:248–264, 1972.

S. Lawrence, et al., Searching for the World Wide Web Science, 280, 98, 1998.

R.K. Ahuja, et al., Network Flows: Theory, Algorithms, and Applications, pp. 166–249. Prentice Hall, Englewood Cliffs, NJ, 1993.

L.R. Ford, et al., "Maximal Flow Through A Network", Canadian J. Math, 8: 399–404, 1956.

* cited by examiner

METHOD TO EFFICIENTLY PARTITION LARGE HYPERLINKED DATABASES BY HYPERLINK STRUCTURE

CROSS-REFERENCE TO RELATED APPLICATIONS

This application is a conversion of provisional applications Ser. No. 60/148,253 filed Aug. 11, 1999 and Ser. No. 60/199,764 filed Apr. 26, 2000.

BACKGROUND OF THE INVENTION

1. Field of the Invention

The present invention relates generally to a method to efficiently partition large hyperlinked databases by hyperlink structure and, more particularly, to partitioning databases into two or more subsets to simplify the task of locating items within a database.

2. Prior Art

Many methods exist for locating specific documents in a large database. One of the simplest and oldest methods is to build indices that permit one to locate all documents that contain desired words and/or attributes. While this is an effective method when applied to small and homogeneously organized databases, it is ineffective and problematic on large and heterogenous databases, such as the World Wide Web (WWW) for many reasons:

- The appearance of specific words in a document may not closely correspond to the type of desired document. For example, the word "abortion" is common to both pro-life and pro-choice documents, but it alone cannot be used to discern between these two document types;
- The best search term for a document may be ineffective because that term may occur with higher probability in undesirable documents. For example, locating the information about the mathematician Michael Jordan is difficult because of confusion with the famous basketball player;
- Many WWW pages use "spam" (misleading and irrelevant text hidden within a document) in order to increase the likelihood that search engines will refer people to them; and
- The number of documents that match a very specific query can be in the thousands, which is still too large for humans to visually inspect in a short time.

For all of these reasons, and many more, finding documents on the WWW is very difficult.

One improvement on text-based searching is to cluster returned documents according to common themes. One search engine known in the art uses this method with clusters potentially being a function of the matching documents' subject, type (e.g., press release, resume, source code), source location (e.g., commercial, personal, magazine), or language.

Another recent advance in search techniques uses the link structure of a document to estimate the document quality. For example, another search engine known in the art uses the number of referring links for a document as an approximate measure of quality; when multiple web pages match a query, the results can be sorted so that the most commonly referenced documents (with highest estimated quality) are returned first.

Other search engines known in the art also use popularity, but instead of weighting search results by the number of incoming links, they order pages as a function of the number of times WWW users load a page. Thus, web pages that other users click on first often will be ranked higher than web pages that are rarely visited by users.

The methods used by these search engines are similar to spectral graph analysis, which uses techniques from linear algebra to find documents which are "hubs" and "authorities". Hubs are documents that refer to many authorities, and authorities are documents that are referenced by many hubs. Classifying documents in this manner allows an automated system to distinguish documents that provide a general overview from those that are very specific.

Since a collection of hyperlinked documents can be abstractly represented as a large graph, it is tempting to use balanced graph partitioning algorithms or graph centroids as a means to partition a database in a meaningful manner. The fault with such an approach is that both underlying problems are NP-hard, which means that only exponential time algorithms are known. Even approximate solutions with quadratic runtime are infeasible because the WWW is simply too large for super-linear algorithms.

There exists a large body of research that uses document content to partition databases into multiple subsets. For example, latent semantic indexing (LSI) is a method that is similar to spectral decomposition. Instead of using link structure to find valuable documents, LSI partitions documents based on keyword indices. Documents which have similar keyword patterns are grouped with one another.

Transforming documents into word vectors (a vector of zeroes and ones, which indicate the absence or presence of a word in a document) also allows methods such as the k-means clustering algorithm to be used to group documents.

The field of bibliometrics uses the citation patterns of literature to extract patterns between related documents. Two common similarity measures are co-citation and bibliographic coupling, which measure the similarity of two documents based on what documents they cite and what documents cite them, respectively. Bibliometrics have also been used to characterize WWW pages as well.

SUMMARY OF THE INVENTION

Therefore it is an object of the present invention to provide a method to efficiently partition large hyperlinked databases by hyperlink structure which overcomes the problems of the prior art.

The principle application of the methods of the present invention is to partition a large database into a smaller subset of relevant documents. Thus, the present methods rapidly locate a community of documents that have the property that each document in the community links to more documents in the same community than it does to documents not in the community. Thus, documents within a community are more tightly coupled to one another than they are to other documents.

By identifying a community, a user (one who searches a database) can limit searches to be within the community of documents, which increases the likelihood that searches return relevant results.

Accordingly, a method for partitioning a database containing a plurality of documents into desired and undesired type documents is provided where the plurality of documents contain text and/or links to and from other documents in the database. The method comprises the steps of: providing a source document of the desired type; providing a sink document for providing access to the database; identifying a cut-set of links which is the smallest set of links such that removing them from the database completely disconnects the source document and its linked documents from the sink document and its linked documents thereby defining first and second subsets of documents, respectively; and defining the first subset of documents as desired type documents and the remaining documents as undesired type documents.

In a preferred implementation, the database is the World Wide Web, the documents are web pages, and the links are hyperlinks between web pages. However, the database can also preferably be a collection of literature, the documents are articles, and the links are citations made in an article to other articles in the database.

The identifying step preferably comprises: mapping at least a portion of the database into a graph structure; and applying a maximum flow algorithm to the graph structure, the subset of the graph structure which remains after application of the maximum flow algorithm being the first subset of documents. The mapping step preferably assigns all documents to have a corresponding vertex and all links to have a corresponding edge.

Preferably, a further search method is applied to the first subset of documents to further partition the first subset of documents into a subset of more desired type documents.

The desired type documents can be those of interest to a user in which case the method preferably further comprises the step of displaying the desired type documents to the user. The desired type documents can also be those which are to be filtered from a user in which case the method further comprises the step of prohibiting display of the desired type documents to the user.

The source document preferably comprises a plurality of seed documents, each of which is of the desired type. Similarly, the sink document comprises a plurality of generic documents, each of which is representative of the database Also provided are a computer program product and program storage device for carrying out the methods of the present invention and for storing a set of instructions to carry out the methods of the present invention, respectively.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Although this invention is applicable to numerous and various types of databases, it has been found particularly useful in the environment of the World Wide Web (WWW). Therefore, without limiting the applicability of the invention to the WWW, the invention will be described in such environment.

For the purpose of this disclosure, a database is defined to be a collection of documents. Documents may contain content and/or links. A document's content can consist of text, multimedia (images, sounds, animation, etc.), programs, or other forms of data. Document links are references to other documents in a database such that a link identifies another document.

The term database is intended to be inclusive of many distributed data storage systems such as the World Wide Web (WWW) and collection of literature. In the case of the WWW, documents correspond to web pages and links correspond to WWW hyperlinks between web pages. For literature, the content consists of the entire body of an article, while the links consist of the citations made in an article to other articles.

In the two preceding examples, the links between documents are explicit in that they uniquely identify a document. However, our invention is also applicable to databases that have implicit links. An implicit link is a weighted value that expresses a relationship between two documents such as keyword overlap. For example, if two documents have identical keywords, then they would implicitly be strongly linked, but if they have no keywords in common, then they would be unlinked. Implicit links can also be used to reflect document authorship, language, or any other measure that could be computed as a function of the content of two documents.

Figure 1:
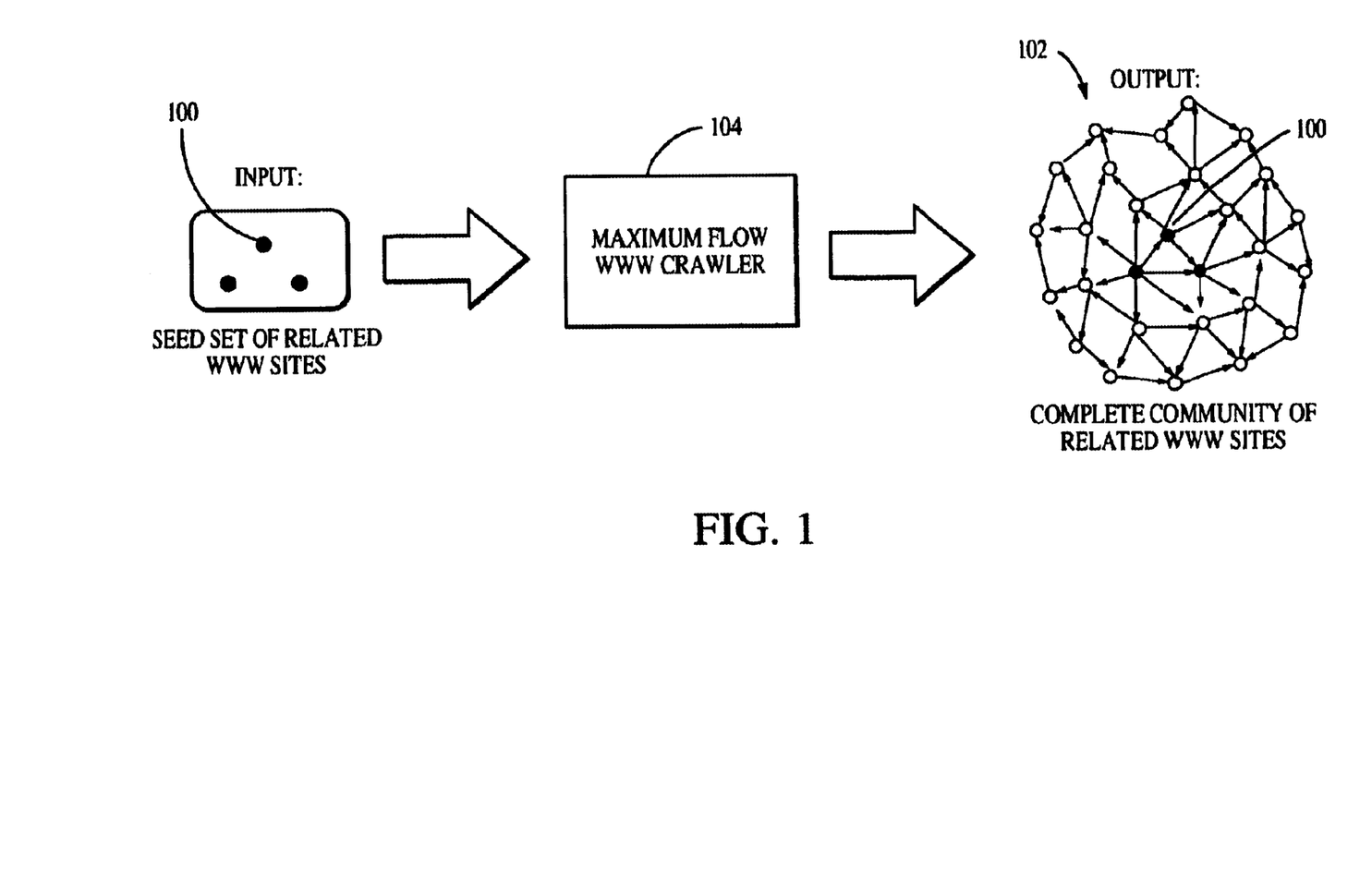
FIG. 1 schematically illustrates the input and output of the methods of the present invention.

Referring now to FIG. 1, the methods of the present invention solve the following problem: given one or more prototype documents 100, divide a database into two subsets such that one subset 102 contains all documents that are "similar" to the prototypes 100, and the other subset contains all documents that are "dissimilar" to the prototypes 100. The prototype documents are alternatively referred to herein as "seed" documents, and the collection of seed documents is referred to as a source document.

The notion of similarity is one of the distinguishing features of the methods of the present invention. For purposes of the present invention, two documents are considered to be similar if and only if they are linked (in either direction) to more similar documents than dissimilar documents. Note that this notion of similarity leads to a recursive definition for a class of documents. For example, under this framework a "baseball" WWW page is one that is linked to more "baseball" WWW pages than "non-baseball" WWW pages. Hence, answering the question "Is page X a baseball WWW page?" would seem to depend on having identified all "baseball" pages before asking the question.

The key ingredient of the methods of the present invention is that we have an exact and efficient method that can partition a database consistent with such recursive definitions.

The methods of the present invention preferably use an s-t minimum cut/maximum flow network algorithm to perform a partitioning of a database. With a pre-specified source and sink documents (which correspond, respectively, to desirable and undesirable documents), the algorithm finds the smallest cut set that divides the source from the sink.

A cut set is a collection of links that have the property that removing them from the database completely disconnects the source documents from the sink documents. Hence, after identifying the cut set and removing those links from the database, all documents that can be reached by starting from a source document and following any remaining links belong to the set of desirable documents. All documents that cannot be reached from a source document through any link are undesirable.

The source document is chosen to be a very general example of a desired subset to be identified (e.g., a baseball WWW page with many links, or an index to universities), while the sink document provides access to the database, it is preferably chosen to be generic and representative of the entire database (e.g., Yahoo!, Lycos, or Excite). Alternatively, although not preferred, the sink document can be linked to all of the documents in the database or a random subset thereof.

Since documents in databases such as the WWW are highly interconnected through hyperlinks, finding the smallest cut set that separates a prototype document from a very generic document essentially defines a perimeter that contains all documents that are more highly connected to each other than to documents outside of the perimeter. In order for the methods of the present invention to work, the number of links coming in and out of the source and sink nodes must be greater in number than the size of the cut set. Thus, it may be necessary to use more than one prototype and combine them as a composite source or sink node until this criteria is met.

For the sake of precision, the methods of the present invention are described in terms of a mathematical structure known as a graph. A graph consists of vertices and edges. An edge joins two vertices together, connecting them, so that one vertex is said to be at the head and the other vertex at the tail. Intuitively, one can think of a vertex as a single point on a piece of paper, and an edge as a directed arrow that connects the points.

Directed graphs (i.e., with directed edges) can be used to represent many types of real world networks. A graph is used to represent a hyperlinked database such that documents map into vertices and links map into edges.

It is often useful to assign a capacity to an edge. An edge from vertex a to vertex b with integer capacity c is identical to having a and b connected with c unit capacity edges.

With these definitions in place, the methods of the present invention can be generalized with the following steps.

a. A user supplies one or more seed documents (e.g., interesting web pages) as input to define the source;
 b. A database is mapped into a graph structure such that all documents have a corresponding vertex and all links have a corresponding edge;
 c. All edges from step (b) are split into two edges such that if document a links to b, then the corresponding vertices for a and b will have edges joining vertex $v_a$ to vertex $v_b$ and vertex $v_b$ to vertex $v_a$. All edges are assigned unit capacity;
 d. A special source vertex, $v_s$ is added to the graph. For each seed document from step (1), $V_x$, an edge is added to the graph from $v_s$ to $V_x$ with infinite (or extremely large) capacity;
 e. A special sink vertex, $V_t$ is added to the graph. The vertices, $v_y$, corresponding to n generic documents (such as the home pages of Yahoo!, Excite, and Lycos) are connected through directed edges from $v_y$ to $v_t$ with unit capacities
 f. A maximum flow algorithm is run on the graph; and
 g. A subset of the graph that remains connected to $v_s$ is the desired result. This subset is enumerated.

Figure 2:
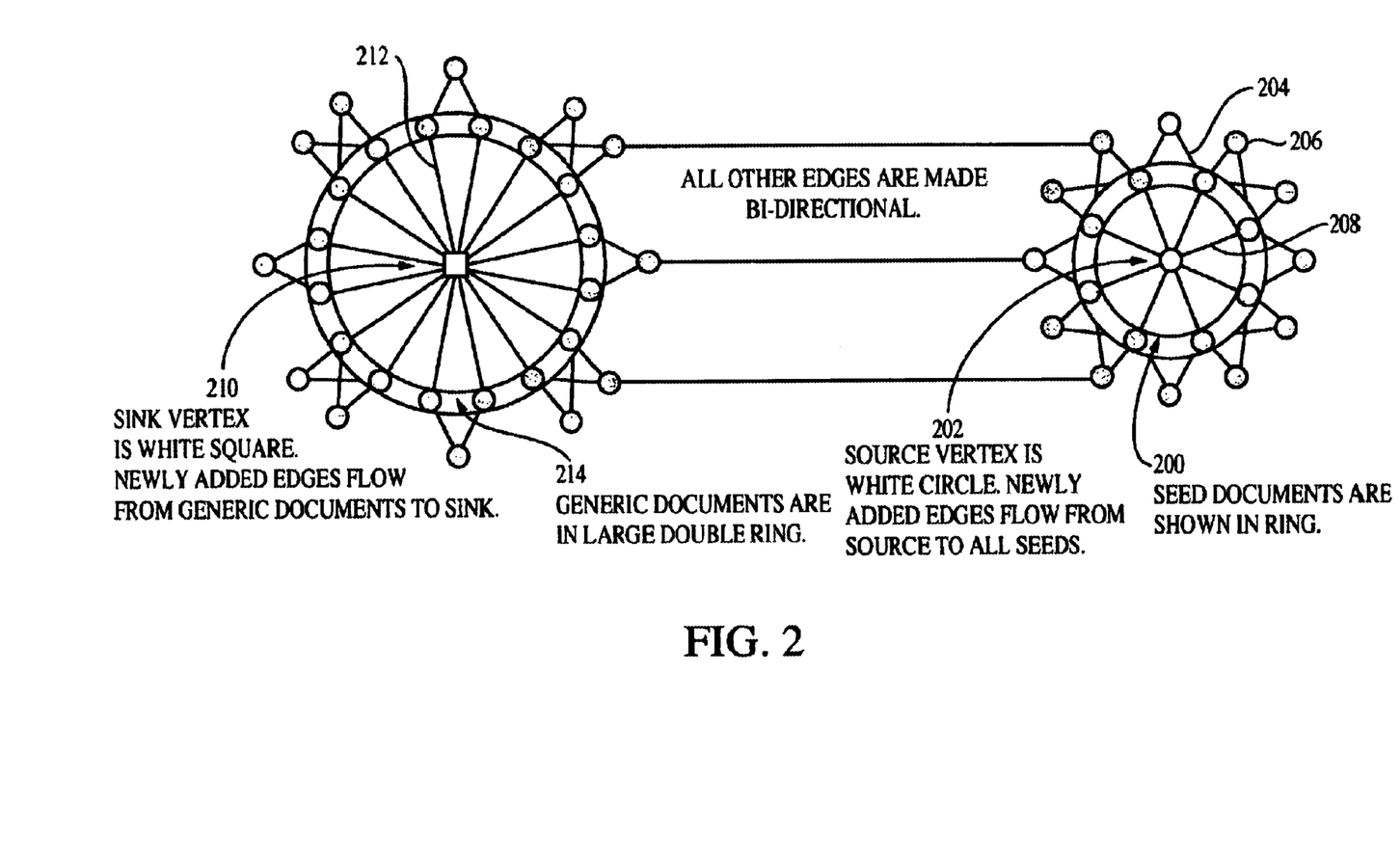
FIG. 2 schematically illustrates the initial setup stage of the methods of the present invention.

Referring now to FIG. 2 there is illustrated the first five preferred steps of the methods of the present invention which will hereafter be discussed in greater detail.

The example used is not chosen to be a particularly realistic version of a database that the invention would find the greatest use; instead, this example is used to be as simple as possible to illustrate how the invention works.

Once the user identifies at least one seed document 200, their names or locations (e.g., a web page universal resource locator (URL)) are noted for later use. As discussed previously, the seed documents are prototypical documents of the type that the user wishes to partition from the rest of the database to be searched. If possible, the seed documents 200 should contain many hyperlinks to and from similar documents. The number of hyperlinks in the seed documents must be greater than the cut set size. While the cut set size is not typically known in advance, the methods of the present invention can identify when the number of hyperlinks in the seed documents 200 is too small. In such an instance, the user will need to identify additional seed documents until the hyperlinks connected to and from the union of all seed documents is greater than the cut set size. The union of all the seed documents as referred to herein as the source 202.

The database to be searched is preferably mapped into a graph structure, however, it is not strictly necessary to convert the entire database under consideration into a graph structure. The database is represented as a graph in FIG. 2 only for illustrative purposes. Instead, it is possible to reference parts of a database in a graph-like structure. For example, it should be apparent to those skilled in the art that a small program script could be written that retrieves a WWW page and extracts all outbound hyperlinks. Inbound hyperlinks can be found by querying publicly available WWW search engines. In this way, one can operate on a database as if it was a graph simply by querying portions of the database that are of interest.

FIG. 2 shows all edges as a single line 204. However, lines that do not connect to the source or sink actually represent two edges: one edge points towards one vertex in the joined pair and the other edge points towards the other vertex. Both of these edges will have unit capacity. Documents 206 that have no hyperlinks between them will have no edges between them.

The white circular vertex 202 in FIG. 2 is the source vertex. Lines 208 that connect to this vertex represent a single edge that points from the source 202 to the seeds 200. These edges 208 have infinite capacity.

The white square vertex 210 in FIG. 2 is the sink vertex. Lines 212 that connect to this vertex represent a single edge that points from the generic document vertices 214 to the sink 210. These edges 212 have unit capacity.

There are several well-known algorithms in the art for solving the maximum flow problem. See Ravindra K. Ahuja et al., *Network Flows: Theory, Algorithms, and Applications*, Prentice Hall (1993) for a large collection of solutions to the maximum flow problem. The preferred implementation of the methods of the present invention uses one of the simplest of such algorithms, known as the "shortest augmentation path" algorithm.

This shortest augmentation path algorithm is illustrated in FIGS. 3a–3e, with the input being equal to the graph constructed as illustrated in FIG. 2, the graph being generally referred to by reference numeral 300. The shortest augmentation path algorithm iteratively finds the shortest path from the source to the sink, marking edges as used in paths that are found (shown as bold lines). When no more paths can be found, the algorithm is finished.

FIGS. 3a–3e are very simplistic examples of how the algorithm works. In reality, flow information for each edge is maintained at each iteration. When a path is found from the source 202 to the sink 210, the flow (or minimum capacity of the edges in the path) is subtracted from the capacities of the edges that are used in the path. In this way, each edge can only pass an amount of flow that does not exceed its capacity.

Figure 3A:
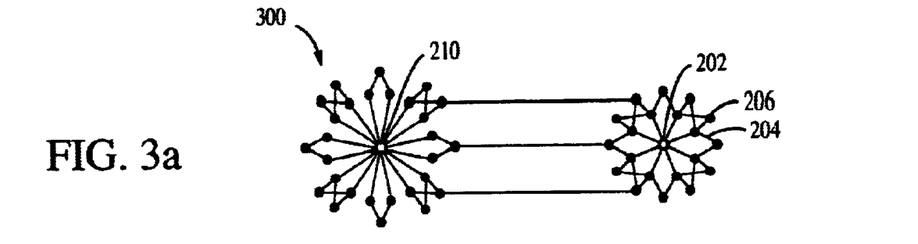
FIGS. 3a–3e illustrate a shortest augmentation path algorithm utilized in a preferred implementation of the methods of the present invention.
Figure 3B:
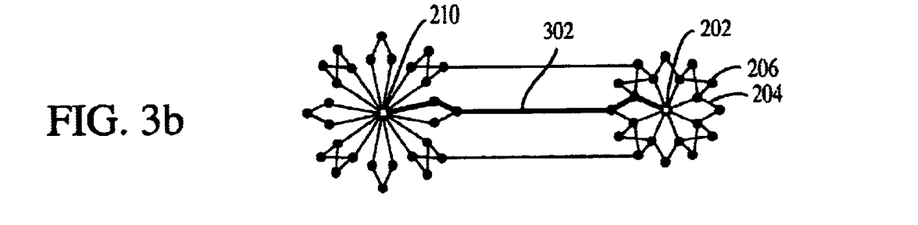
Figure 3C:
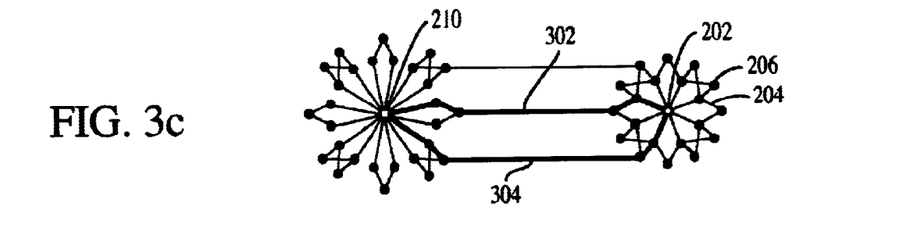
Figure 3D:
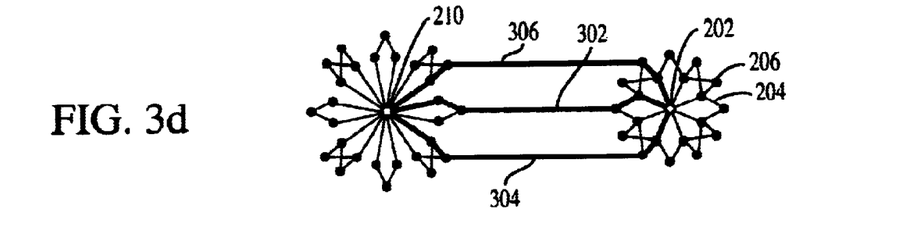

At FIG. 3a, the source node 202 shown as a white circle and sink node 210 shown as a white square are graphically depicted with all other nodes representing documents 206 and line edges 204 between documents. At FIG. 3b, the shortest path from the source to the sink is identified (shown as bold line 302). At FIG. 3c, a second shortest path from the source to the sink is identified (shown as bold line 304) such that the second path and all later identified paths do not reuse edges marked in earlier paths. At FIG. 3d, a third shortest path from the source to the sink is identified (shown as bold line 306). The process continues until all paths from the source 202 to the sink 210 are identified. In the illustrative example, three such paths exist. As discussed above, the illustrative example shown in FIGS. 2 and 3 is a very simplistic one, in practice, a great number of iterations are performed until all of the paths from the source 202 to the sink 210 are identified. Finally, at FIG. 3e, after all such paths are identified, all the marked edges are removed, leaving two disconnected subgraphs 308, 310.

Since maximum flow algorithms have been known for nearly half a century, further details of such are omitted in favor of simplicity and clarity.

Figure 3E:
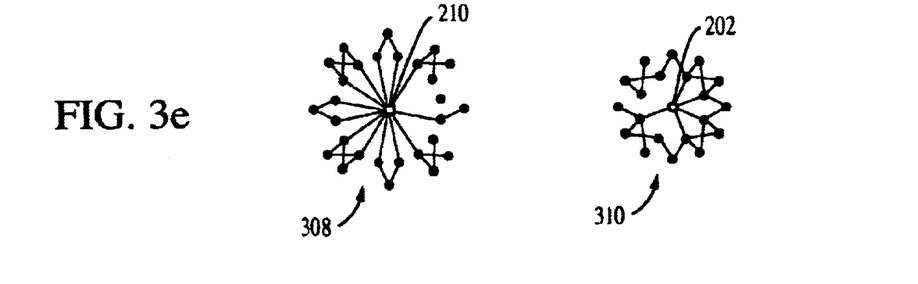

Preferably the "max flow-min cut" theorem (L. R. Ford et al. Maximal flow through a network, Canadian J. Math., 8:399–404, 1956) provides this last step in the methods of the present invention. Once the maximum flow of a network has been identified, the edges of the paths that pass the flow from the source to the sink contain edges that form the minimal cut set that separates the source from the sink. This means that vertices that are still indirectly connected to the source vertex after running the maximum flow algorithm have the property that they have more links to documents in this set 310 then links to documents not connected to the source (set 308).

The documents in the subset 310 that are indirectly connected to the source can be enumerated by traversing all vertices that are reachable from the source 202 through any remaining edge. These remaining documents (e.g., web sites) in the source subset 310 are output (e.g., displayed) as related to the input seed documents 200 (e.g., web sites).

Because the methods of the present invention are very computationally efficient, the following software systems can be built with respect to the entire WWW. FIG. 1 illustrates how each system uses the methods of the present invention.

Specialized Search Engine. Currently, WWW search engines only index a fraction of the WWW because it is growing at a rate faster than any single search engine can index. Collectively, all search engines index less than half of the WWW. As a result, search engines that focus on narrow communities of web pages have a much better chance of indexing all pages that are relevant to a community. The methods of the present invention allow a focused web crawler 104 (a special program that only retrieves web pages related to some category) to exhaustively crawl a community.

WWW Filters. Many companies attempt to identify all WWW pages that contain pornographic and/or hate content so that they can filter such content from customers (usually, families and libraries that desire such filters). One reason why this is a difficult problem is that each WWW page must be either checked via human inspection (which is slow and expensive) or categorized automatically by a program that looks for "hot" words. The later approach has many shortcomings, as when many WWW sites from Essex, England found themselves blacklisted by WWW filters because they had the misfortune of having a provocative sounding name.

The methods of the present invention can be used to identify the communities of pornographic and hate WWW sites because they can define a pornographic WWW site to be one which links to more pornographic sites than non-pornographic sites. As a result, the methods of the present invention require little human intervention, are not fooled by tame language, and do not erroneously label web pages from Essex to be pornographic. By periodically updating such a list, one could filter the offending WWW sites from users.

Improved WWW Portals. WWW portals, such as Yahoo!, attempt to categorize many WWW sites in a topical hierarchy. Unfortunately, these human constructed indices are often out-of-date and omit many relevant WWW sites. By using the WWW sites listed under a category as a source set, the methods of the present invention can identify all WWW sites that belong to the community defined by the source sites. The most important web sites in a community can then be identified with the spectral methods described earlier.

Identifying Similar WWW Pages. Many WWW users have interests that are not easily categorized or are so far removed from the mainstream that WWW portal sites do not even attempt to categorize them. With the methods of the present invention, a user can supply a source set of sites, and have returned a list of WWW sites that belong in the same community. Moreover, this use can easily be extended so that searches can be performed so that only WWW sites within the community are returned.

Referring back to an earlier example, if a user supplied a source set of mathematical oriented WWW sites, such as the home pages of university mathematics departments, then the search for "Michael Jordan" would return results about the mathematician rather than the basketball player.

It will be apparent to those skilled in the art that the methods of the present invention has many advantages over prior art methods. These advantages include:

(a) The methods of the present invention run in time O(mc) in the worst case, where m is the number of hyperlinks and c is the cut set size. Thus, it is feasible to run this methods on the entire WWW as input.

(b) The results of the methods of the present invention are transparent. If the goal is to isolate all baseball WWW pages, then the invention will define a baseball web page to be one which is referenced to or by more baseball web pages than non-baseball web pages. This means that indices without actual content (such as Yahoo!'s page of baseball players) will also be identified as being baseball pages despite the fact that such indices often contain no content about baseball other than the hyperlinks.

(c) The methods of the present invention exploit regularity and structure that occurs in non-random hyperlinked databases. Examples of structural regularity found in the WWW include:

Links occur with a power-law distribution. This means that a few popular sites are linked many orders of magnitude more often than the vast number of unpopular sites.

The WWW appear to be a small-world network, meaning that if a path exist between two documents, it will be a very short path with high probability.

Many popular sites are "hubs" which connect to thousands of other sites.

Portions of the web are highly interconnected yet partially isolated from the rest of the Internet.

(d) Since the methods of the present invention only consider link structure, they will work even if documents are in different languages.

It will also be apparent to those skilled in the art that the methods of the present invention disclosed herein may be embodied and performed completely by software contained in an appropriate storage medium for controlling a computer.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for partitioning a database containing a plurality of documents into desired and undesired type documents, the plurality of documents containing text and/or links to and from other documents in the database, the method comprising the steps of:

providing a source document of the desired type, the source document including a collection of seed documents linked to more similar documents of the desired type than to dissimilar documents of the undesired type;

providing a sink document for providing access to the database, the sink document is generic and representative of the database;

identifying a cut-set of links which is the smallest set of links such that removing them from the database completely disconnects the source document and its linked documents from the sink document and its linked documents thereby defining first and second subsets of documents, respectively; and defining the first subset of documents as desired type documents and the remaining documents as undesired type documents.

2. The method of claim 1, wherein the database is the World Wide Web, the documents are web pages, and the links are hyperlinks between web pages.

3. The method of claim 1, wherein the database is a collection of literature, the documents are articles, and the links are citations made in an article to other articles in the database.

4. The method of claim 1, wherein the identifying step comprises:

mapping at least a portion of the database into a graph structure; and applying a maximum flow algorithm to the graph structure, the subset of the graph structure which remains after application of the maximum flow algorithm being the first subset of documents.

5. The method of claim 4, wherein the mapping step assigns all documents to have a corresponding vertex and all links to have a corresponding edge.

6. The method of claim 1, further comprising the step of applying a further search method to the first subset of documents to further partition the first subset of documents into a subset of more desired type documents.

7. The method of claim 1, wherein the desired type documents are those of interest to a user and the method further comprises the step of displaying the desired type documents to the user.

8. The method of claim 1, wherein the desired type documents are those to be filtered from a user and the method further comprises the step of prohibiting display of the desired type documents to the user.

9. The method of claim 1, wherein the sink document comprises a plurality of generic documents, each of which provides access to the database.

10. A program storage device readable by machine, tangibly embodying a program of instructions executable by the machine to perform method steps for partitioning a database containing a plurality of documents into desired and undesired type documents, the plurality of documents containing text and/or links to and from other documents in the database, the method comprising the steps of:

providing a source document of the desired type, the source document including a collection of seed documents linked to more similar documents of the desired type than to dissimilar documents of the undesired type;

providing a sink document for providing access to the database, the sink document is generic and representative of the database;

identifying a cut-set of links which is the smallest set of links such that removing them from the database completely disconnects the source document and its linked documents from the sink document and its linked documents into first and second subsets of documents, respectively; and defining the first subset of documents as desired type documents and the remaining documents as undesired type documents.

11. The method of claim 10, wherein the database is the World Wide Web, the documents are web pages, and the links are hyperlinks between web pages.

12. The method of claim 10, wherein the database is a collection of literature, the documents are articles, and the links are citations made in an article to other articles in the database.

13. The method of claim 10, wherein the identifying step comprises:

mapping at least a portion of the database into a graph structure; and applying a maximum flow algorithm to the graph structure, the subset of the graph structure which remains after application of the maximum flow algorithm being the first subset of documents.

14. The method of claim 13, wherein the mapping step assigns all documents to have a corresponding vertex and all links to have a corresponding edge.

15. The method of claim 10, further comprising the step of applying a further search method to the first subset of documents to further partition the first subset of documents into a subset of more desired type documents.

16. The method of claim 10, wherein the desired type documents are those of interest to a user and the method further comprises the step of displaying the desired type documents to the user.

17. The method of claim 10, wherein the desired type documents are those to be filtered from a user and the method further comprises the step of prohibiting display of the desired type documents to the user.

18. The method of claim 10, wherein the sink document comprises a plurality of generic documents, each of which provides access to the database.

19. A computer program product embodied in a computer-readable medium for partitioning a database containing a plurality of documents into desired and undesired type documents, the plurality of documents containing text and/or links to and from other documents in the database, the computer program product comprising:

computer readable program code means for providing a source document of the desired type, the source document including a collection of seed documents linked to more similar documents of the desired type than to dissimilar documents of the undesired type;

computer readable program code means for providing a sink document for providing access to the database, the sink document is generic and representative of the database;

computer readable program code means for identifying a cut-set of links which is the smallest set of links such that removing them from the database completely disconnects the source document and its linked documents from the sink document and its linked documents into first and second subsets of documents, respectively; and computer readable program code means for defining the first subset of documents as desired type documents and the remaining documents as undesired type documents.

20. The computer program product of claim 19, wherein the database is the World Wide Web, the documents are web pages, and the links are hyperlinks between web pages.

21. The computer program product of claim 19, wherein the database is a collection of literature, the documents are articles, and the links are citations made in an article to other articles in the database.

22. The computer program product of claim 19, wherein the computer readable program code means for identifying the cut-set of links comprises:

computer readable program code means for mapping at least a portion of the database into a graph structure; and computer readable program code means for applying a maximum flow algorithm to the graph structure, the subset of the graph structure which remains after application of the maximum flow algorithm being the first subset of documents.

23. The computer program product of claim 22, wherein the computer readable program code means for mapping at least a portion of the database into a graph structure assigns all documents to have a corresponding vertex and all links to have a corresponding edge.

24. The computer program product of claim 19, further comprising computer readable program code means for applying a further search method to the first subset of documents to further partition the first subset of documents into a subset of more desired type documents.

25. The computer program product of claim 21, wherein the desired type documents are those of interest to a user and the computer program product further comprises computer readable program code means for displaying the desired type documents to the user.

26. The computer program product of claim 19, wherein the desired type documents are those to be filtered from a user and the computer program product further comprises computer readable program code means for prohibiting display of the desired type documents to the user.

27. The computer program product of claim 19, wherein the sink document comprises a plurality of generic documents, each of which provides access to the database.

* * * * *